Jan. 13, 1959 L. E. ALLEN 2,867,958
HEADER MOUNTING FOR HARVESTER THRESHERS
Filed May 7, 1956 5 Sheets-Sheet 1

Inventor
Lawrence E. Allen
by
Attorney

Jan. 13, 1959  L. E. ALLEN  2,867,958
HEADER MOUNTING FOR HARVESTER THRESHERS
Filed May 7, 1956  5 Sheets-Sheet 2

Inventor
Lawrence E. Allen
by
Attorney

Jan. 13, 1959 L. E. ALLEN 2,867,958
HEADER MOUNTING FOR HARVESTER THRESHERS
Filed May 7, 1956 5 Sheets-Sheet 4

Inventor
Lawrence E. Allen
By
Attorney

United States Patent Office 2,867,958
Patented Jan. 13, 1959

2,867,958

HEADER MOUNTING FOR HARVESTER THRESHERS

Lawrence E. Allen, Independence, Mo., assignor to Allis-Chalmers Manufacturing Company, Milwaukee, Wis.

Application May 7, 1956, Serial No. 583,317

3 Claims. (Cl. 56—21)

The invention relates to harvesting machines, and it is concerned more particularly with a harvester thresher, preferably of the self-propelled type, which may be taken apart for purposes of highway travel and reassembled in the field within a minimum of time and with a minimum amount of skill and labor.

In order to meet prevailing highway restrictions it has heretofore been customary to detach the header of large combines from the rest of the machine, so that the header can be arranged lengthwise during highway travel rather than crosswise as it would be if left in its normal position on the main body of the machine. The work heretofore involved in separating the header from and reinstalling it on the main body of the machine has usually been cumbersome and time consuming because it required the removal and reinsertion of a large number of connecting bolts, and also a good deal of maneuvering and prying in order to release the bolts for withdrawal and to align the bolt holes for reinsertion of the bolts.

Generally, it is an object of the invention to provide an improved detachable header mounting which will take care of the hereinabove mentioned difficulties in a practical and entirely satisfactory manner.

More specifically it is an object of the invention to provide an improved harvester thresher which may be prepared for separation of the header from the main body of the machine by releasing a relatively small number of locking elements, preferably in the form of wedges; subsequent actual separation of the header unit being accomplished by forward movement of the header away from the main body, or preferably by rearward movement of the main body on its own wheels away from the header.

Another object of the invention is to provide an improved harvester thresher of the above outlined character, wherein movable locking elements are permanently installed on the header is readily accessible positions, and wherein other locking elements are likewise installed in readily accessible positions on the main body of the machine.

A still further object of the invention is to provide an improved header assembly which is equipped with coupling sockets, coupling prongs and locking wedges which greatly facilitate the work and reduce the time for detaching the header from and reattaching it to the main body of the machine.

These and other objects and advantages are attained by the present invention various novel features of which will be apparent from the description herein and the accompanying drawings disclosing an embodiment of the invention, and will be more particularly pointed out in the appended claims.

Figure 1:
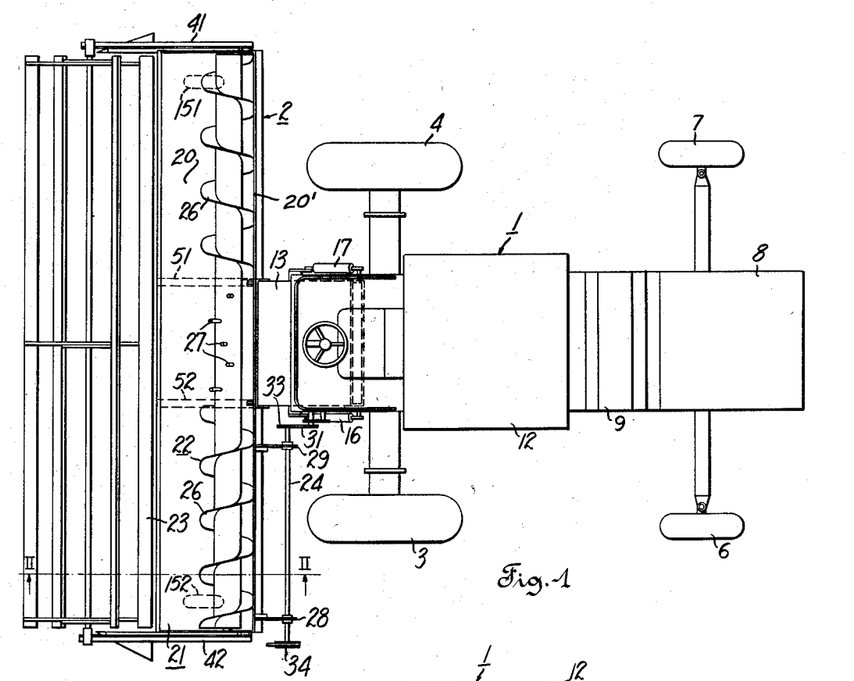
Fig. 1 is a somewhat schematic top view of a self-propelled combine.
Figure 2:
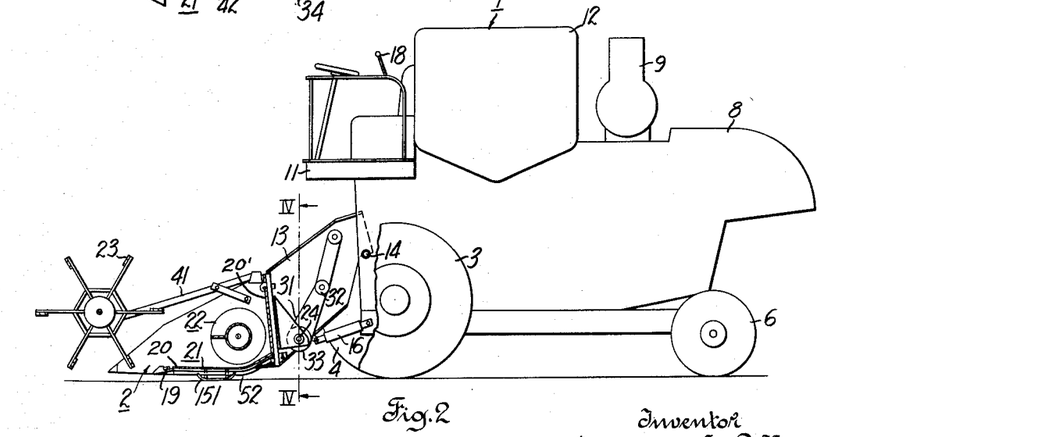
Fig. 2 is a somewhat schematic side elevation of the combine shown in Fig. 1 with the near front wheel partially broken away, the header of the combine being shown in section on line II—II of Fig. 1.

The combine shown in Figs. 1 and 2, comprises two principal units, namely, a mobile longitudinal body structure generally indicated by the reference character 1, and a laterally extended header structure generally indicated by the reference character 2. The body structure 1 is of generally conventional construction in that it comprises a pair of laterally spaced front driving wheels 3 and 4, a pair of laterally spaced steerable rear wheels 6 and 7, a separator mechanism enclosed within a housing 8, and an engine 9 for supplying power to the driving wheels 3 and 4 and to other power driven parts of the combine. The body structure 1 further comprises an operator's station 11, a grain bin 12, and a thresher mechanism enclosed within a housing or narrow throat portion 13 at the forward end of the body structure. The thresher housing 13 is pivoted at 14 for selective up and down adjustment to different elevated positions above the ground affording desired cuttings heights of the header structure. Up and down adjustment of the thresher housing 13, about the pivot 14 is accomplished in conventional manner by a pair of hydraulic rams 16 and 17 and a control mechanism including a hand lever 18 at the operator's station 11.

The header structure 2, like the body structure 1, conforms generally with established principles of construction and operation. That is, the header structure 2 includes a cutting mechanism 19 of the reciprocating sickle bar type which extends across the full width of the header, and an L-shaped pan or trough 21 which has a generally horizontal bottom wall 20 in rear of the cutting mechanism 19, and a rear wall 20' extending upwardly from the bottom wall. The header structure further includes a conventional transverse auger 22 within the pan 21, and a conventional sweep reel 23. The entire header structure including the cutting mechanism, pan, auger and reel is detachably secured to the forward end of the thresher housing 13 in a novel manner which greatly facilitates the work of detaching the header structure from, and reattaching it to, the body structure of the combine, and which will be more fully explained hereinbelow.

As shown in Fig. 1, the header 2 extends transversely outward from opposite sides of the thresher housing 13, the total width of the header being substantially greater than the overall width of the body structure 1 as is usual in large combines. The auger 22 includes opposite flighting 26 for feeding the cut crop from the laterally outer ends toward the midportion of the header which is directly in front of the thresher housing 13. The auger 22 is conventionally equipped with a series of retractable fingers 27 for delivering the crop from the header pan into the thresher housing or throat structure 13.

Figure 3:
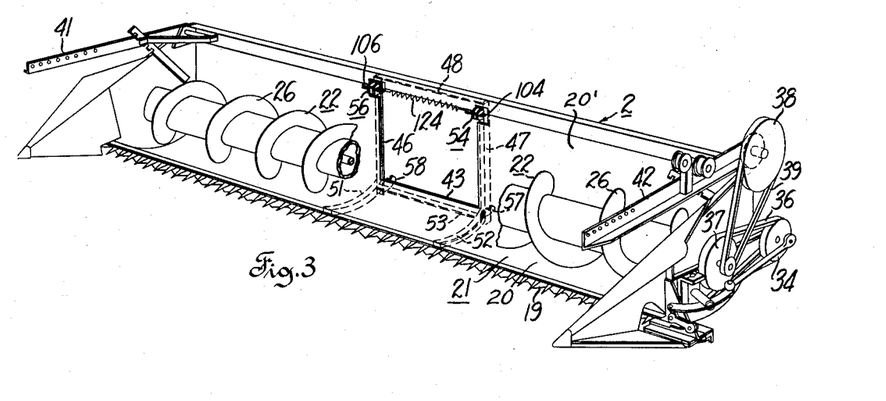
Fig. 3 is a perspective view of part of the header assembly of the combine shown in Figs. 1 and 2, the header reel being omitted and parts of the header auger being broken away for purposes of disclosure.

A conventionally constructed mechanism for driving the sickle bar, auger and reel is mounted on the portion of the header which extends to the left from the thresher housing 13, as viewed from the operator's station 11. As shown in Fig. 1, the drive mechanism for the sickle bar, auger and reel includes a horizontal shaft 24 which is rotatably mounted in transversely spaced brackets 28 and 29 in rear of the pan 21. As shown in Fig. 2, a chain 31 cooperates with a driving sprocket 32 at the left side of the thresher housing 13 and with a driven sprocket 33 which, as shown in Fig. 1, is secured to the inner end of the shaft 24. Keyed to the outer end of the shaft 24 is a V-belt sheave 34 which, as shown in Fig. 3, is operatively connected with the cutting mechanism 19 of the header. The V-belt sheave 34 also drives the auger 22 by means of a belt 36 and a sheave 37. Another sheave 38 for driving the reel 23 is rotatably mounted on the header frame and driven from the sheave 37 by means of a belt 39. The reel 23 is mounted for back and forth adjustment on a pair of vertically adjustable arms 41 and 42 in conventional manner.

Figure 4:
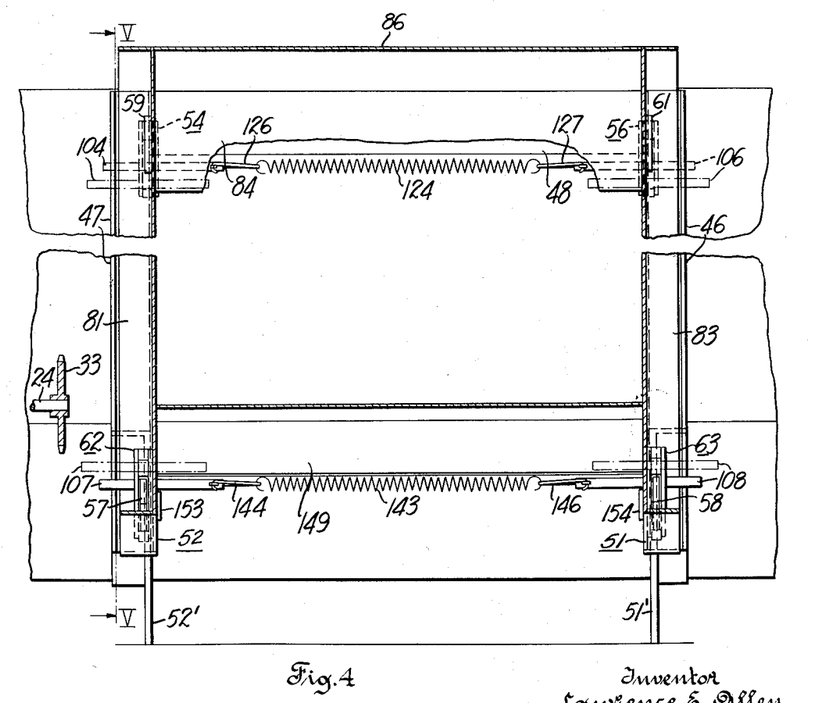
Fig. 4 is an enlarged, fragmentary section on line IV—IV of Fig. 2.
Figure 6:
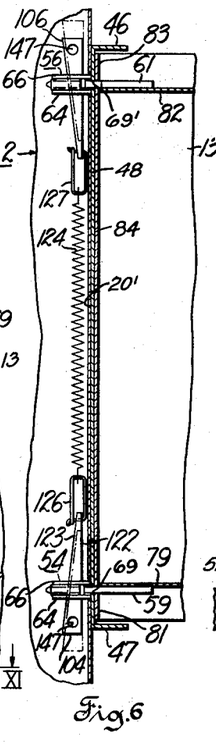
Fig. 6 is a sectional view on line VI—VI of Fig. 5.
Figure 7:
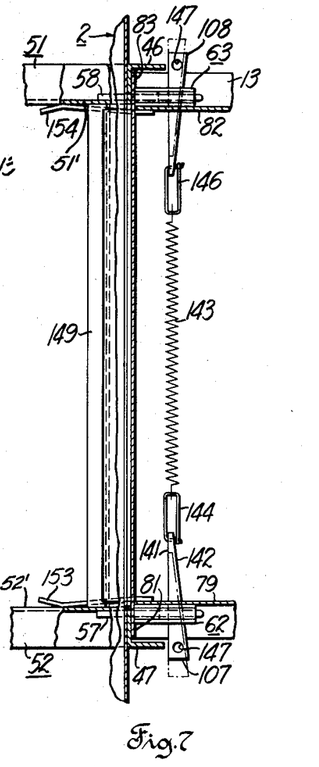
Fig. 7 is a sectional view on line VII—VII of Fig. 5.
Figure 17:
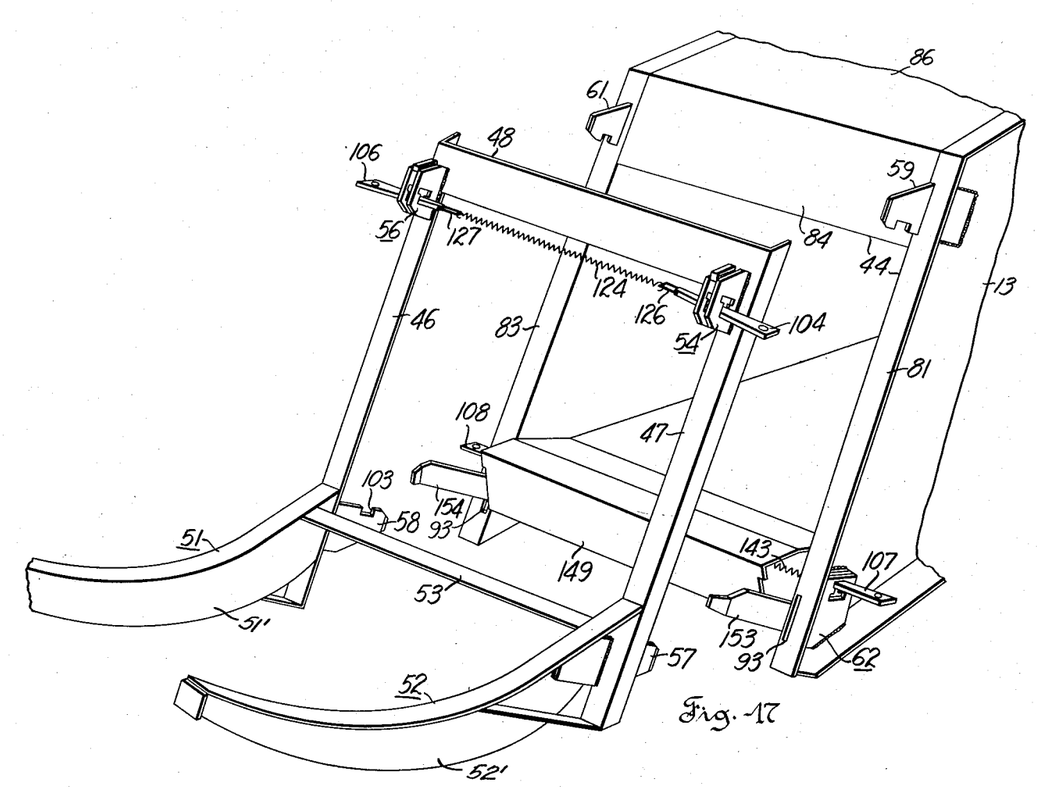
Fig. 17 is a diagrammatic, perspective view of a midportion of the header frame and of the inlet portion of the thresher housing, the header frame being shown at a forward spacing from the thresher housing and in a condition of lateral and vertical alignment with the latter.

As shown in Fig. 3, the upwardly extending rear wall of the header 2 presents a rectangular material discharge opening 43 which in the assembled condition of the machine, as shown in Figs. 1 and 2, registers with a rectangular material inlet opening 44 (Fig. 17) at the forward end of the thresher housing 13. The frame work of the header includes a pair of angle iron posts 46 and 47 which extend along the transversely opposite vertical edges, respectively, of the pan opening 43. The upper ends of the angle irons 46 and 47 are connected together by means of a vertical cross plate 48 as best shown in Fig. 17. Each of the angle irons 46 and 47 has a front flange arranged in parallel relation to and in contact with the rear face of the upwardly extending rear wall of the pan 21, portions of the pan rear wall being permanently secured to the adjacent front flanges of the angle irons 46 and 47, respectively, by rivets or the like, not shown. The angle irons 46 and 47 are arranged in channel forming relation to each other so as to define a transverse space, in rear of their front flanges, which is bounded at one side by the rearwardly extending flange of the angle iron 46 and at the other side by the rearwardly extending flange of the angle iron 47. The rear of the front flanges of angle irons 46 and 47 and of the vertical cross plate 48 form a rearwardly facing thrust transmitting mounting surface which coacts with the harvester throat 13. The width of the transverse space between the rearwardly extending flanges of the angle irons 46 and 47 is somewhat greater than the width of the front end of the thresher housing or throat 13 so that the latter may enter said space and be withdrawn therefrom as illustrated by Figs. 4, 6 and 7, and as will be explained more fully hereinbelow.

Figure 5:
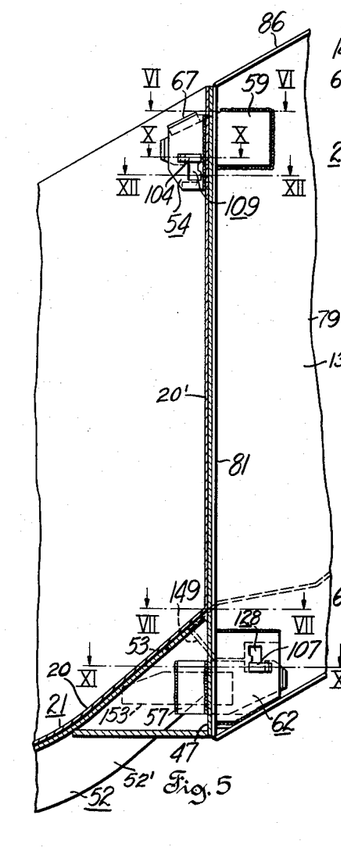
Fig. 5 is a sectional view, on line V—V of Fig. 4, of relatively adjoining header and housing parts.

As shown in Fig. 17, a pair of curved supporting arms 51 and 52 for the bottom wall 20 of the pan 21 are rigidly secured to the front flanges of the angle irons 46 and 47, respectively. Each of the arms 51 and 52 is generally L-shaped in cross section and presents a transverse upper flange in face to face engagement with the underside of the bottom wall of the pan 21, and a vertical flange which extends at right angles from the upper flange in depending relation to the bottom wall of the pan 21. A cross brace 53 extends between the relatively opposed vertical flanges 51' and 52' of the curved supporting arms 51 and 52 at a short distance forwardly of the angle irons 46 and 47 as shown in Fig. 17, and as also indicated in Fig. 5.

The body structure 1, and the header structure 2 are held together in the assembled condition in which they are shown in Figs. 1 and 2 by separable means in the form of four coupling devices or elements which are located adjacent to the four corners, respectively, of the material discharge opening 43 of the header as indicated in Fig. 3. The coupling device which, as viewed in Figs. 3 and 17, is located at the upper right hand corner of the discharge opening 43 comprises coupling prong receiving means in the form of a coupling socket 54 which is rigidly mounted on the front flange of the angle iron 47 in forwardly projecting relation to the upwardly extending rear wall of the pan 21. A similar coupling socket 56 is mounted on the front flange of the angle iron 46 near the upper end of the latter as generally indicated in Figs. 3 and 17. Rectangular openings 69 and 69' (Figs. 6 and 10) are cut through front flanges of angle irons 46 and 47 so as to register with the sockets 54 and 56 respectively. The coupling device at the lower right hand corner of the discharge opening 43, as viewed in Fig. 3, comprises a rearwardly projecting coupling prong member 57 which is secured, as by welding, to the downwardly extending flange 52' of the curved supporting arm 52 as shown in detail in Figs. 5, 11 and 17. A similar rearwardly projecting prong member 58 is secured to the downwardly extending flange 51' of the curved supporting arm 51.

Complementary parts for the upper coupling sockets 54 and 56, and for the lower coupling prongs 57 and 58 of the header structure 2 are mounted on the forward end of the thresher housing 13 in proximity to the four corners, respectively, of the material inlet opening 44, as generally indicated in Fig. 17. Upper coupling prongs 59 and 61 for cooperative engagement with the upper coupling sockets 54 and 56, respectively, of the header extend forwardly from an upper part of the thresher housing 13, and a pair of lower coupling sockets 62 and 63 (Figs. 4 and 7) for cooperative engagement with the lower coupling prongs 57 and 58 of the header are rigidly mounted on lower left and right side portions, respectively, of the thresher housing 13, as viewed from the operator's station 11.

Figures 10, 11, 12, 13, 14, 15, 16:
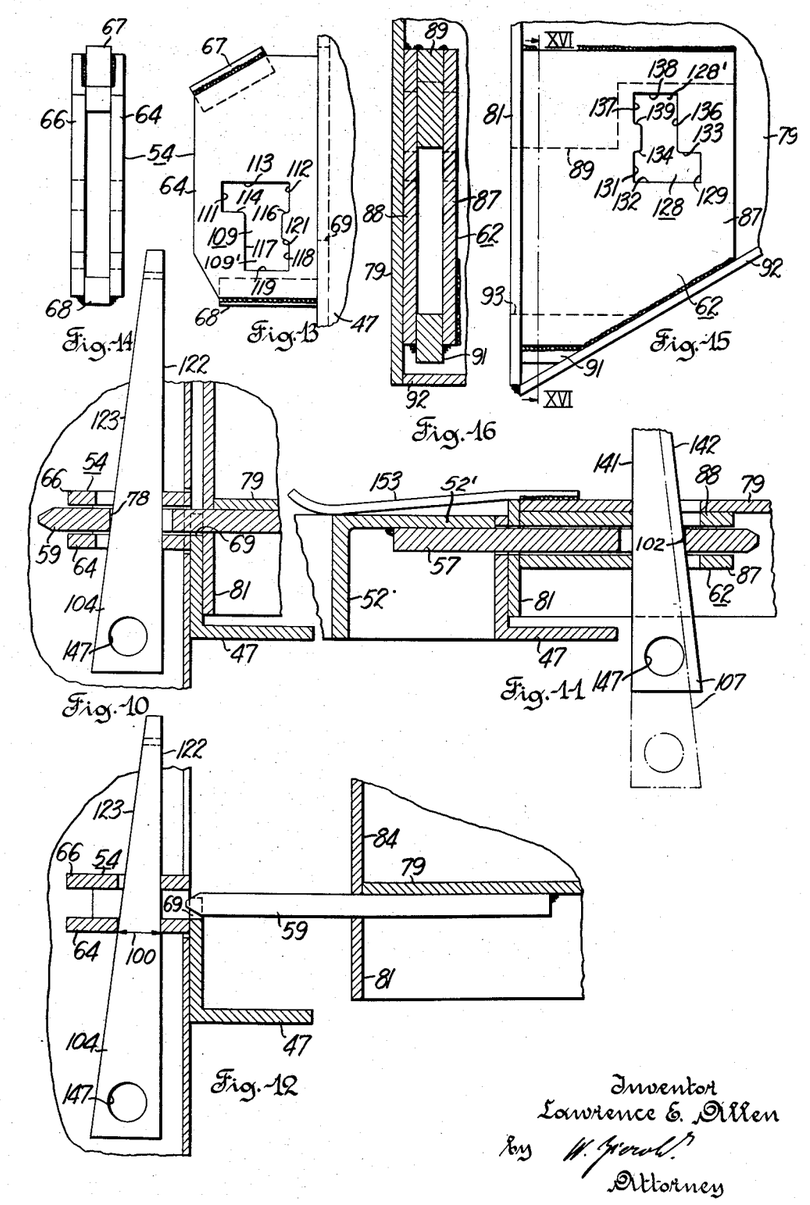
Fig. 10 is an enlarged detail view in section on line X—X of Fig. 5 showing relatively adjoining upper header and housing parts in connected condition.
Fig. 11 is an enlarged detail view in section on line XI—XI of Fig. 5 showing relatively adjoining lower header and housing parts in connected condition.
Fig. 12 is an enlarged detail view of header and housing parts shown in section on line XII—XII of Fig. 5 and in a condition of horizontal displacement relative to each other; the view of Fig. 12 also showing a locking wedge in a condition of adjustment different from that in which it is shown in Fig. 10.
Fig. 13 is an enlarged side elevation of an upper coupling socket and adjoining header frame portion shown in Fig. 5.
Fig. 14 is a front elevation of the coupling socket shown in Fig. 13.
Fig. 15 is an enlarged side elevation of a lower coupling socket and adjoining housing portions shown in Fig. 5.
Fig. 16 is a section on line XVI—XVI of Fig. 15.

The detail construction of the upper coupling socket 54 on the header is shown in Figs. 13 and 14, and the other coupling socket 56 on the upper part of the header is a duplicate of the coupling socket 54. As shown in Figs. 13 and 14, the coupling socket 54 comprises two vertical plates 64 and 66 which are separated from each other by an upper spacer block 67 and by a lower spacer block 68, the plates 64 and 66 being secured to the spacer blocks by welding at the outer edges of the plates. The assembly of the plates 64, 66 and spacer blocks 67, 68 is fixedly secured to the forward face of the front flange of the angle iron 47 by welding. The front flange of the angle iron 47 has a rectangular cutout or rear opening 69 (Fig. 10) which registers with the open space between the plates 64 and 66 of the coupling socket 54, so that the complementary coupling prong 59 of the thresher housing may project through the cutout 69 and into the space between the plates 64 and 66 as indicated in the lower part of Fig. 6.

Figure 8:
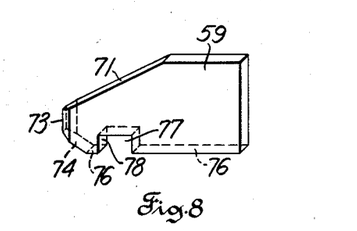
Figs. 8 and 9 are enlarged perspective views of an upper and a lower coupling prong, respectively, shown in Fig. 5.

The upper coupling prong 59 of the thresher housing 13, as shown in Fig. 8, has a forwardly and downwardly inclined top edge 71 for cooperative engagement with the bottom surface of the spacer block 67 as indicated in Fig. 5. The front end of the coupling prong 59 is beveled at both sides along a relatively short vertical front edge 73, and a rearwardly and downwardly inclined guide surface 74 extends between the lower end of the front edge 73, and the horizontal bottom edge 76 of the coupling prong. The bottom edge 76 is upwardly recessed by a square notch 77 which is formed in the lower part of the coupling prong 59 is underlying relation to the inclined top surface 71. The provision of the notch 77 affords a forward load or longitudinal thrust transmitting transverse shoulder 78 in the vertically recessed lower edge portion of the coupling prong 59. The rearward portion of the coupling prong 59 is welded along its top, bottom and rear edges to the left hand side wall 79 of the thresher housing 13 at the outside of the latter as shown in Figs. 5 and 17. A vertical, laterally outward extending front flange 81 at the left side of the thresher housing 13, as seen from the operator's station 11, is cut out around the forwardly projecting part of the coupling prong 59.

The foregoing explanations with reference to the upper coupling prong 59 of the thresher housing 13, similarly apply to the other upper coupling prong 61 of the thresher housing 13, as shown in Figs. 6 and 17. The coupling prong 61 is welded at its rear end to the right hand side wall 82 of the thresher housing 13 at the outside of the latter, and a laterally outward extending front flange 83 at the right side of the thresher housing is cut out around the coupling prong 61. The upper portions of the front flanges 81 and 83 of the thresher housing or throat 13 are connected by a transverse vertically extending front plate 84, and a portion of the rearwardly and upwardly inclined top wall of the thresher housing 13 is indicated at 86 in Figs. 5 and 17. The front flanges 81, 83 and the front plate 84 constitute a forwardly facing thrust transmitting surface.

The lower coupling socket 62 (Fig. 17) at the lower left forward corner of the thresher housing 13, as viewed from the operator's station 11, is shown in detail in Figs. 15 and 16. Referring to these figures, the coupling socket 62 comprises two vertical plates 87 and 88, an upper spacing block 89, and a lower spacing block 91. The plates 87 and 88 are welded along their top edges to the upper edge of the spacing block 89, and the plates 87 and 88 are welded along their bottom edges to the lower spacing block 91. The coupling socket 62 is welded along its top edge to the outer side of the housing wall 79 and the lower portion of the coupling socket 62 is welded to a rearwardly and upwardly extending side flange 92 of the thresher housing 13, as best shown in Fig. 17. The vertical front flange 81 which extends laterally outward from the left side wall 79 of the thresher housing is welded at its lower end to the forward end of the housing flange 92, and a rectangular opening 93 is cut into the front flange 81 so as to register with the space between the plates 87 and 88 of the coupling socket 62.

The foregoing explanations with respect to the lower coupling socket 62 at the left hand lower front corner of the thresher housing 13, similarly apply to the lower coupling socket 63 at the lower right hand forward corner of the thresher housing 13 (Figs. 4 and 7). The coupling socket 63 is positioned on the outside of the right hand side wall 82 of the thresher housing 13, and cooperates with the lower coupling prong 58 (Figs. 3 and 17) of the header structure 2.

Figure 9:
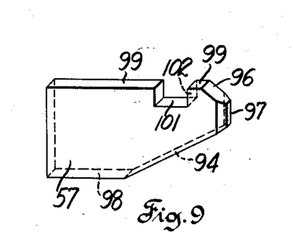

The lower coupling prong 57 shown in Fig. 3 is connected, as stated, to the pan supporting arm 52, and the shape of the coupling prong 57 is shown in detail in Fig. 9. Referring to Fig. 9, the rearward end portion of the coupling prong 57 has an upwardly inclined bottom edge 94, a downwardly inclined top edge 96, and a relatively short vertical rear edge 97, between the rear ends of the inclined bottom and top edges 94 and 96. The rear end of the prong 57 is beveled at both sides along the vertical rear edge 97. A horizontal bottom edge 98 extends rearwardly from the inclined bottom edge 94, and a horizontal top edge 99 extends rearwardly from the inclined edge 96. The top edge 99 is downwardly recessed by a square notch 101 which is formed in the upper part of the coupling prong 57 in overlying relation to the inclined bottom edge 94. The provision of the notch 101 affords a rearward load or longitudinal thrust transmitting transverse shoulder 102 in the vertically recessed upper edge portion of the coupling prong 57.

As shown in Fig. 11, the forward portion of the lower coupling prong 57 of the header extends rearwardly through a cutout in the front flange of the angle iron 47 as indicated in Fig. 17, and the portion of the coupling prong 57 which extends forwardly beyond the angle iron 47 is secured to the latter and to the downwardly extending flange of the supporting arm 52 by welding, as indicated in Fig. 17.

The foregoing explanations with reference to the lower coupling prong 57 of the header similarly apply to the other lower coupling prong 58 which extends rearwardly from the angle iron 46 of the header structure. The coupling prong 58 has a rearward load transmitting transverse shoulder 103 corresponding to the rearward load transmitting transverse shoulder 102 of the coupling prong 57.

In the assembled condition of the combine as shown in Figs. 1 and 2, the upper coupling prongs 59 and 61 (Fig. 17) of the body structure 1 cooperate in vertical and lateral load transmitting relation with the upper coupling sockets 54 and 56, respectively, of the header structure 2, and the lower coupling prongs 57 and 58 of the header structure 2 cooperate in vertical and lateral load transmitting relation with the lower coupling sockets 62 and 63, respectively, of the body structure 1. As shown in Figs. 4, 5, 6 and 10, the upper coupling prongs 59 and 61 are prevented from rearward movement out of the coupling sockets 54 and 56, respectively, by a pair of upper locking wedges 104 and 106, respectively (Fig. 6), and as shown in Figs. 4, 5, 7 and 11, the lower coupling prongs 57 and 58 are prevented from forward movement out of the sockets 62 and 63, respectively, by a pair of lower locking wedges 107 and 108 (Fig. 7).

Referring to Fig. 13, each of the side plates 64 and 66 of the upper coupling socket 54 has a vertically elongated locking wedge receiving aperture 109 which is wider at the top than at the bottom. The wide upper part of each aperture 109 provides a first operative mounting position for the locking wedge and is defined by a vertical front edge 111, a vertical rear edge 112, a horizontal top edge 113, and horizontal shoulders 114 and 116 below the top edge 113. The narrow lower part of the aperture 109 constitutes a stop element 109' which is defined by a vertical front edge 117, a vertical rear edge 118, a horizontal bottom edge 119 and a horizontal shoulder 121 above the bottom edge 119. The narrow part provides a second inoperative mounting position for the locking wedge. As shown in Fig. 10, the locking wedge 104 for the coupling prong 59 has a straight rear edge 122 which in the assembled condition of the combine as shown in Figs. 1 and 2, bears against the vertical rear edges 112 (Fig. 13) of the apertures 109 in the coupling socket 54. The front edge 123 (Fig. 10) of the locking wedge 104 tapers horizontally toward the rear edge 122, and in the assembled condition of the combine as shown in Figs. 1 and 2, the tapered front edge 123 of the wedge 104 bears against the forward load transmitting transverse shoulder 78 (Fig. 8) of the coupling prong 59. As indicated in Fig. 5, the locking wedge 104 has a vertical thickness slightly less than the vertical spacing of the shoulders 114 and 116 (Fig. 13) from the top edge 113 of the aperture 109 in each side plate of the socket 54. When the locking wedge 104 is in its operative locking position as indicated in Figs. 5, 6 and 10, the top edges 113 (Fig. 13), the shoulders 114, and the shoulders 116 of the socket plates 64 and 66 act as stops to limit upward and downward displacement of the wedge 104 within the wide upper parts of the socket apertures 109.

The foregoing explanations with reference to the upper locking wedge 104 similarly apply to the upper locking wedge 106 which, as shown in Fig. 6, secures the upper coupling prong 61 against rearward movement out of the coupling socket 56. Referring to Fig. 6, it will be noted that the locking wedges 104 and 106 are oppositely tapered in converging relation to each other, and resilient means in the form of a coil spring 124 is operatively interposed between the wedges 104 and 106 so as to bias these wedges endwise toward each other. One end of the coil spring 124 is hooked into a wire clip 126 which in turn is hooked into a hole at the narrow end of the wedge 104, and a similar wire clip 127 connects the other end of the spring 124 with the narrow end of the wedge 106. The spring 124 is proportioned so that it will be in a state of elastic elongation when the parts are arranged as indicated in Figs. 6 and 10, and the wedges will thereby be prevented from working endwise and downward out of cooperative engagement with the shoulders 78 of the prongs 59 and 61, respectively.

Referring to Figs. 4, 5, 7 and 11, the lower locking wedge 107 for the lower coupling prong 57 is positioned in vertically elongated apertures 128 (Fig. 5) which are formed in the side plates of the coupling socket 62. As best shown in Fig. 15, the vertically elongated aperture 128 in the outer plate 87 of the coupling socket 62 is wider at its lower part than at its upper part. The wide lower part of the aperture 128 is defined by a vertical rear edge 129, a vertical front edge 131, a horizontal bottom edge 132, and horizontal shoulders 133 and 134 above the bottom edge 132. The narrow upper part of the aperture 128 constitutes a stop member 128' which is defined by a vertical rear edge 136, a vertical front edge 137, a horizontal top edge 138 and a short horizontal shoulder 139 below the top edge 138. The inner side plate 88 (Fig. 16) of the coupling socket 62 and the side wall 79 of the thresher housing 13 each have a vertically elongated aperture of the same shape as, and in registering relation with, the aperture 128 in the outer side plate 87 of the coupling socket 62. When the locking wedge 107 is in its operative locking position in the lower wide parts of the apertures 128 as indicated in Figs. 5 and 11, the straight front edge 141 of the wedge bears against the vertical front edges 131 (Fig. 15) of the coupling socket 62, and the tapered rear edge 142 of the locking wedge bears against the rearward load transmitting transverse shoulder 102 (Fig. 9) of the coupling prong 57. The vertical thickness of the locking wedge 107 is slightly less than the vertical spacing of the horizontal shoulders 133 and 134 from the horizontal bottom edge 132 in Fig. 15 so that the bottom edges 132 and the shoulders 133 and 134 of the coupling socket 62 will serve as stops to limit vertical displacement of the wedge 107 from its locking position in the wide lower parts of the socket apertures 128.

The foregoing explanations with respect to the lower locking wedge 107 similarly apply to the lower locking wedge 108 which secures the lower coupling prong 58 of the header structure 2 against forward separation from the coupling socket 63 at the right hand lower forward corner of the thresher housing 13. The lower locking wedges 107 and 108, like the upper locking wedges 104 and 106, are oppositely tapered in converging relation to each other, as shown in Fig. 7, and a coil spring 143 is operatively interposed between the lower wedges 107 and 108 by means of detachable wire clips 144 and 146 so as to bias the wedges endwise toward each other.

In Figs. 3 and 17 the upper locking wedges 104 and 106 are shown in downwardly adjusted inoperative positions, and these inoperative positions of the upper wedges are also indicated in dash dotted lines in Figs. 4 and 6. Fig. 12 is an enlarged view showing the cooperative relation between the downwardly adjusted upper wedge 104 and the associated coupling socket 54. It will be noted that the wedge 104 as shown in Fig. 12 is in an outwardly displaced or retracted position as compared with the upwardly adjusted, inwardly projected, operative position in which it is shown in Fig. 10. The outwardly displaced or retracted position of the wedge 104 as shown in Fig. 12 is determined by engagement of the straight and inclined edges 122 and 123 of the wedge with the rear and front edges 118 and 117, respectively (Fig. 13), of the narrow parts of the socket apertures 109. The vertical spacing of the socket shoulders 121 from the lower edges 119 of the socket apertures 109 is slightly larger than the vertical thickness of the wedge 104, and the bottom edges 119 and shoulders 121 of the socket apertures 109 serve as stops to limit vertical displacement of the wedge 104 from its retracted inoperative position within the narrow lower parts of the socket apertures 109.

The upper locking wedge 106 may be adjusted like the upper locking wedge 104, from a raised, inwardly projected operative position to a lowered, outwardly retracted inoperative position, as indicated in dash dotted lines in Fig. 4. The tension of the spring 124 which is slightly increased by the increase of the lengthwise spacing of the wedges from each other when they are adjusted from their operative to their inoperative positions, prevents the wedges from working endwise and upward into the wide upper parts of the socket apertures 109.

Comparing the full line and the dash dotted line positions of the wedges 104 and 106 in Fig. 6, it will be noted, with reference to Figs. 12 and 13, that a midportion 100 (Fig. 12) of the wedge 104, and a corresponding midportion of the wedge 106, are each of the same horizontal width as the narrow lower part of the vertically elongated apertures in the upper coupling sockets 54 and 56, respectively. At their wide ends, the upper wedges 104 and 106 are preferably of greater horizontal width than the wide upper parts of the vertically elongated apertures of the upper coupling sockets 54 and 56, respectively.

The foregoing explanations with respect to the horizontal width relations between the upper locking wedges 104 and 106, and the vertically elongated aperture of the upper coupling sockets 54 and 56 similarly apply to the lower locking wedges 107 and 108 and to the vertically elongated apertures 128 of the lower coupling sockets 62 and 63. That is, each of the lower wedges may be adjusted from a lowered, inwardly projected, operative position to a raised, outwardly retracted, inoperative position, the lowered operative positions of the wedges 107 and 108 being shown in full lines in Figs. 4 and 7, and the raised inoperative positions of the wedges 107 and 108 being shown in dash dotted lines in Figs. 4 and 7, and in full lines in Fig. 17. The spring 143, and the shoulders 139 (Fig. 15) of the socket apertures 128 are effective to releasably secure the lower locking wedges 107 and 108 in their upwardly adjusted inoperative positions on the thresher housing 13.

Comparing the full line and the dash dotted line positions of the lower wedges 107 and 108 in Fig. 7, it will be noted, with reference to Fig. 15, that each of the lower wedges 107 and 108 has a midportion of the same horizontal width as the narrow upper parts of the vertically elongated apertures 128 of the lower coupling sockets 62 and 63, respectively. At their wide ends, the lower wedges 107 and 108 are preferably of greater horizontal width than the wide lower parts of the vertically elongated apertures in the lower coupling sockets 62 and 63, respectively.

Referring to Fig. 3, it will be noted that the upper locking wedges 104 and 106 are positioned at the forwardly facing side of the header pan 21 where they are readily accessible for manipulation. The lower wedges 107 and 108, on the other hand extend outwardly from opposite sides of the thresher housing as indicated in Fig. 17. The inner ends of the lower wedges 107 and 108 and the spring 143 are positioned under the bottom wall (Fig. 5) of the thresher housing 13 and in rear of an angular apron 149 (Fig. 17) which extends forwardly beyond the side flanges 81 and 83 of the thresher housing. The apron 149 serves as a support on which a portion of the bottom wall of the pan 21 may rest when the header and the thresher housing are secured together. Access to the lower wedges 107, 108 for purposes of manipulation may be had conveniently from the sides of the thresher housing 13 as well as from its underside, and each of the wedges 104, 106, 107 and 108 has a hole 147 in its wide end to facilitate manipulation.

If it is desired to disconnect the header structure 2 from the body structure 1, the drive chain 31 (Fig. 2) may be opened so that the shaft 24 will be removable in unison with the entire header structure from the main body structure. The wedges 104, 106, 107 and 108 are each manipulated so as to disengage them from the associated coupling prongs 59, 61, 57 and 58, respectively. In order to disengage the locking wedge 104 an operator may pull the spring 124 aside with one hand, and holding a hammer in his other hand he may tap the small end of the wedge endwise so as to move it outward and thereby disengage it from the forward load transmitting shoulder 78 of the coupling prong 59. The wedge 104 may then be pulled endwise in a laterally outward direction somewhat beyond the dash dotted line retracted position in which it is shown in Figs. 4 and 6. Such outward movement of the wedge 104 will cause its tapered edge 123 to recede from the front edges 111 of the coupling socket 54. When the wedge 104 has been moved endwise outwardly far enough so that its front edge 123 clears shoulders 114 and its rear edge 122 clears the shoulders 116 (Fig. 13) of the socket 54, the wedge 104 may then be moved downwardly into the narrow part of the socket apertures 109. Such downward movement of the wedge 104 is transverse to the coupling prong 59 and causes the wedge to move out of the recess 77 (Fig. 8). When the wedge engages the bottom edges 119 (Fig. 13) of the socket apertures 109, the outward pull on the wedge may be relaxed so that the spring 124 will become effective to pull the wedge inward. As a result of such inward pull a portion of the tapered edge 123 about midway between the ends of the wedge will engage the front edges 117 of the lower narrow parts of the socket apertures 109, and the rear edge 122 of the wedge will bear against the rear edges 118 of the lower narrow parts of the socket apertures 109. The shoulders 121 (Fig. 13) of the coupling socket 54 will prevent upward movement of the wedge 104 from its downwardly adjusted position in which it is shown in Fig. 17.

The foregoing explanations with reference to the disengagement of the wedge 104 from the coupling prong 59 and its downward adjustment transversely of that prong into a lowered, inoperative position, similarly apply to the upper locking wedge 106 which is associated with the upper coupling socket 56 on the header structure.

The lower locking wedges 107 and 108 may be released from cooperative engagement with the coupling prongs 57 and 58, respectively, and they may then be moved transversely of the coupling prongs 57 and 58 to their hereinabove mentioned upwardly adjusted inoperative positions in a manner similar to that which has been explained hereinbefore with reference to wedges 104 and 106. That is, the small end of the wedge 107 may be tapped with a hammer after the spring 143 has been pulled out of the way, and moved endwise outwardly somewhat beyond the dash dotted line retracted position in which it is shown in Figs. 4 and 7. As a result of such movement the inclined edge 142 of the wedge 107 will be disengaged from the rearward load transmitting shoulder 102 of the coupling prong 57, and the wedge 107 may then be moved transversely of the coupling prong 57 out of the open ended recess 101 of the latter by upward movement into the narrow part of the apertures 128 of the coupling socket 62. In its upwardly adjusted inoperative position the midportion of the wedge 107 will engage the front and rear edges 136 and 137 (Fig. 15) and the shoulders 139 of the coupling socket 62. The lower locking wedge 108 will be similarly retained in an outward retracted, inoperative position by cooperative engagement of a midportion thereof with the upper parts of the apertures 128 in the coupling socket 63.

After the upper locking wedges 104 and 106 have been moved to their downwardly adjusted inoperative positions, and after the lower locking wedges 107 and 108 have been moved to their upwardly adjusted inoperative positions as indicated in dash dotted lines in Fig. 4, the separation of the header structure 2 from the body structure 1, may be effected simply by longitudinal movement of the body structure 1 on its wheels rearwardly away from the header structure 2. During such separating movement the header structure may be left resting on the ground or on any suitable support such as a wheeled transport dolly (not shown). As indicated in dotted lines in Fig. 1, a pair of runners 151 and 152 are mounted below the pan 21 adjacent the transversely opposed ends of the header, and these runners may furnish suitable support for the header during the attaching and detaching operations.

After the header has been detached from the body structure 1, the latter will be ready for highway use and the header structure may also be transported on highways if pulled lengthwise, that is, in the longitudinal direction of the auger 22.

After the main body structure 1 and the header structure 2 have been transported separately to the field where the combine is to be used, the header and body structure are arranged at right angles to each other as schematically indicated by Fig. 17, so as to bring the coupling prongs on the header and the coupling prongs on the thresher housing into approximate alignment with their corresponding coupling sockets.

In the condition of preparatory alignment as illustrated by Fig. 17, the lower coupling prongs 57 and 58 on the header structure 2 extend generally on the horizontal level and in the vertical planes, respectively, of the coupling sockets 62 and 63 on the thresher housing 13, and the upper coupling prongs 59 and 61 on the thresher housing 13 extend generally on the horizontal level and in the vertical planes, respectively, of the coupling sockets 54 and 56, respectively, on the header structure. The hydraulic rams 16 and 17 (Fig. 2) may be operated by manipulation of the control lever 18 so as to raise or lower the thresher housing 13 about the pivot center 14 to the proper height which affords the desired vertical position of the coupling prongs and sockets on the thresher housing relative to the coupling prongs and sockets on the header. Horizontal forward movement of the body structure 1 on its wheels toward the header structure will then cause the lower coupling prongs 57 and 58 to enter the lower coupling sockets 62 and 63 and, at the same time, the upper coupling prongs 59 and 61 will be moved into the coupling sockets 54 and 56, respectively. In this manner the upper pair of laterally spaced coupling prongs 59 and 61 which are secured to and project forwardly from the body structure 1 may be moved into overlapping relation with the header structure 2 so as to engage the latter in upward and lateral load transmitting relation, and the lower pair of laterally spaced coupling prongs which are secured to and project rearwardly from the header structure 2 may be moved into overlapping relation with the body structure 1 so as to engage the latter in downward and lateral load transmitting relation.

In order to facilitate entry of the coupling prongs into their respective coupling sockets, a pair of pilot extensions 153 and 154 are mounted on the thresher housing 13 so as to extend forwardly therefrom and into the space between the vertical flanges 51' and 52' of the pan supporting brackets 51 and 52 as indicated in Figs. 7 and 17. The forward ends of the pilot extensions 153 and 154 are bent inwardly so as to facilitate entry of these extensions into the space between the brackets 51 and 52, and so as to correct minor transverse misalignments of the header structure relative to the body structure. Cooperative engagement of the pilot extension 153 with the inner side of the pan supporting bracket 52 may move the header structure slightly to the left, as viewed from the operator's station in Fig. 1, and lateral engagement of the pilot extension 154 with the pan supporting bracket 51 may move the header structure 2 slightly to the right during the forward movement of the body structure into cooperative engagement with the header structure. The vertical flanges 51' and 52' of the pan supporting brackets 51 and 52 afford guide elements for the pilot extensions 154 and 153, respectively, and these guide elements and their associated pilot extensions present vertical side surfaces, respectively, in lateral load transmitting relation to each other for determining a laterally adjusted attaching position of the header structure 2 relative to the body structure 1 independently of the four coupling devices which are represented by the prongs 57, 58, 59, 61 and by the coupling sockets 54, 56, 62 and 63.

Entry of the lower coupling prongs 57 and 58 into the coupling sockets 62 and 63, respectively, will be facilitated by cooperative engagement of their upwardly slanting edges 94 (Fig. 9) with the spacer blocks 91 (Figs. 15 and 16) of the lower coupling sockets 62 and 63, respectively; and by cooperative engagement of the slanting edges 96 of the coupling prongs 57 and 58, respectively, with the upper spacer blocks 89 of the lower coupling sockets 62 and 63, respectively. Similarly, entry of the upper coupling prongs 59 and 61 into the coupling sockets 54 and 56, respectively, will be facilitated by cooperative engagement of the slanting top edges 71 (Fig. 8) of these prongs with the bottom edges of the spacer blocks 67 (Fig. 13), and by cooperative engagement of the slanting edges 74 (Fig. 8) of the upper coupling prongs with the lower edges of the cutouts 69 (Fig. 13) in the angle irons 46 and 47, respectively. The lateral taper of the coupling prongs as indicated in Fig. 12 also facilitates entry of the prongs into their associated sockets.

After the upper and lower coupling prongs have initially entered their corresponding coupling sockets, approaching movement of the body structure 1 toward the header structure may be continued until the vertical front flanges 81 and 83 of the thresher housing 13 come into face to face engagement with the angle irons 47 and 46, respectively, at the rear faces of the front flanges of the latter. In this condition of the parts the forwardly extending upper coupling prongs will engage the spacer blocks 67 of the coupling sockets 54 and 56 in upward load transmitting relation, and the lower edges 98 (Fig. 9) of the rearwardly extending lower coupling prongs 57 and 58 will be disposed in downwardly load transmitting relation to the lower spacer blocks 91 of the lower coupling sockets 62 and 63.

While the coupling prongs move into their respective coupling sockets, the locking wedges 104 and 106 are located in the lower narrow portions of the socket apertures 109 (Fig. 13), and the lower locking wedges 107 and 108 are located in the upper narrow portions of the socket apertures 128 (Fig. 15). After the housing flanges 81 and 83 (Fig. 17) have engaged the rearwardly facing flange surfaces of the angle irons 47 and 46, the upper locking wedges 104 and 106 may be pulled outward so as to disengage them from the lower shoulders 121 (Fig. 13) and the wedges may then be moved upward transversely to the coupling prongs 59 and 61 and into the open ended recesses 77 of these prongs. The outward pull on the locking wedges may then be relaxed and the spring 124 will become effective to force the tapered surfaces 123 (Fig. 10) of the locking wedges into cooperative engagement with the forward load transmitting shoulders 78 (Fig. 8) of the upper coupling prongs 59 and 61.

Similarly, the lower locking wedges 107 and 108 are in their upwardly adjusted inoperative positions while the lower coupling prongs 57 and 58 enter the coupling sockets 62 and 63. Downward adjustment of the lower locking wedges from their inoperative positions will bring the wedges into the open ended recesses 101 of the lower coupling prongs, and the spring 143 will force the tapered rear edges 142 (Fig. 11) of the locking wedges into cooperative engagement with the rearward load transmitting shoulders 102 and 103 of the lower coupling prongs 57 and 58, respectively. The lower spring 143 provides enough tension to urge the wedges 107 and 108 toward each other. This tension is sufficient to eliminate play between the prongs 57, 58 and their respective wedges 107, 108.

When the machine is moving in the field it is subjected to jars and vibration, and in order to keep the header from chattering on the body structure the wedges 104, 106, 107 and 108 must be tight in their respective locking positions. Upon installation of the wedges, while the machine is standing still, the wedges may not slide home into their fully seated locking positions under the pull of the springs 124 and 143, respectively. However, as soon as the machine starts moving, the resulting jars and vibration and the steady pull exerted by the springs 124 and 143 upon the wedges will cause the wedges to slide home automatically into their fully seated positions. That is, the wedges will work themselves progressively into their fully seated positions in which all play of the coupling prongs in their respective coupling sockets is taken up. Due to this mode of operation of the mechanism, it is unnecessary to pound the wedges home into their locking positions while the machine is standing still. As a result, undue wear and tear of the coupling prongs and sockets will be avoided, and only light tapping of the wedges will be necessary in order to release them for adjustment into their inoperative positions.

It should be understood that it is not intended to limit the invention to the herein disclosed forms and details of construction and that the invention includes such other forms and modifications as are embraced by the scope of the appended claims.

It is claimed and desired to secure by Letters Patent:

1. A harvester thresher comprising in combination a mobile longitudinal body structure presenting a narrow throat structure having a forwardly facing thrust transmitting surface, a laterally extending header structure having a rearwardly facing thrust transmitting surface in cooperable engagement with said forwardly facing thrust transmitting surface; and separable means for positively urging said thrust transmitting surfaces into abutting engagement with each other, said means comprising coupling prong members mounted on one of said structures, said coupling prongs each having a transverse shoulder to transmit a longitudinal thrust, means mounted on the other of said structures for receiving said coupling prongs, and locking wedges operatively interposed between the other of said structures and said transverse shoulders.

2. A harvester thresher comprising in combination a mobile longitudinal body structure presenting a narrow throat structure having a forwardly facing thrust transmitting surface, a laterally extending header structure having a rearwardly facing thrust transmitting surface in cooperable engagement with said forwardly facing thrust transmitting surface, separable means for positively urging said thrust transmitting surfaces into abutting engagement with each other, said means comprising coupling prongs mounted on one of said structures, said coupling prongs each having a transverse shoulder for transmitting a longitudinal thrust, means mounted on the other of said structures for receiving said coupling prongs and having transverse bearing shoulders for transmitting longitudinal thrust, tapered locking wedges operatively interposed between the respective said shoulders of said structures, and resilient means operatively connected to the narrow tapered ends of said wedges for constantly biasing the latter in cooperative engagement with said transverse shoulders causing said shoulders to effect relative longitudinal abutting thrust transmitting action on said facing surfaces.

3. A harvester thresher comprising in combination a mobile longitudinal body structure presenting a narrow throat structure having a forwardly facing thrust transmitting surface, a laterally extending header structure having a rearwardly facing thrust transmitting surface in cooperable engagement with said forwardly facing thrust transmitting surface; and separable means for positively urging said thrust transmitting surfaces into abutting engagement with each other, said means comprising; coupling prongs mounted on one of said structures and each having a first transverse shoulder for transmitting longitudinal thrust; coupling sockets mounted on the other of said structures for receiving said coupling prongs and each having a second transverse bearing shoulder for transmitting a longitudinal thrust, each said socket having a vertically elongated locking wedge receiving aperture narrower at one end than at the other to provide a first mounting position in alignment with said shoulder and second inoperative mounting position; tapered locking wedges releasably mounted in said first positions afforded by said wedge receiving apertures and operatively interposed between said coupling sockets with tapered sides of said wedge against said transverse shoulders; and resilient means operatively connected with the narrow ends of said wedges for constantly biasing the latter in cooperative engagement with said transverse shoulders to cause relative longitudinally abutting thrust transmitting action on said facing surfaces; said locking wedges being retractable from said wedge receiving apertures against the bias of said resilient means and movable transversely of said transverse shoulders to said second inoperative mounting positions and releasably retained therein by said resilient means.

References Cited in the file of this patent

UNITED STATES PATENTS

| | | |
|---|---|---|
| 1,269,522 | Breneman | June 11, 1918 |
| 1,464,740 | Benjamin et al. | Aug. 14, 1923 |
| 2,529,180 | Oehler | Nov. 7, 1950 |
| 2,753,675 | Harp | July 10, 1956 |